United States Patent [19]
Simon Bacardit

[11] Patent Number: 6,023,931
[45] Date of Patent: Feb. 15, 2000

[54] MASTER CYLINDER WITH DYNAMIC REACTION REGULATED BY A DIFFERENCE IN CROSS SECTION

[75] Inventor: Juan Simon Bacardit, Drancy, France

[73] Assignee: Bosch Sistemas de Frenado, S.L., Barcelona, Spain

[21] Appl. No.: 09/077,396

[22] Filed: May 26, 1998

[30] Foreign Application Priority Data

Jun. 27, 1997 [FR] France .................................. 97 08123

[51] Int. Cl.[7] .................................................. B60T 13/20
[52] U.S. Cl. ................................................. 60/552; 91/370
[58] Field of Search ........................... 91/370, 372, 373, 91/374, 377, 378; 60/552, 553

[56] References Cited

U.S. PATENT DOCUMENTS

| | | |
|---|---|---|
| 3,188,796 | 6/1965 | French et al. ........................ 60/553 X |
| 3,817,037 | 6/1974 | Belart ........................................ 60/552 |
| 3,990,241 | 11/1976 | Owens ..................................... 60/553 |
| 4,967,560 | 11/1990 | Konishi ................................. 91/374 X |
| 5,715,680 | 2/1998 | Kruckemeyer et al. .................. 60/552 |

*Primary Examiner*—John E. Ryznic
*Attorney, Agent, or Firm*—Leo H. McCormick, Jr; Warren Comstock

[57] ABSTRACT

A master cylinder and pneumatic brake booster having hydraulic reaction means. The hydraulic reaction means which is mounted to slide within a main piston (12) in the master cylinder includes a central shut-off piston (4), a stepped and hollow reaction piston (5) and a ratio-change piston (6). First (71), second (72) and third (73) springs are associated with said hydraulic reaction means such that a push rod (3) receives only a portion of a reaction force is an actuation force is applied rapidly which is proportional to a difference between an internal cross section of the reaction piston (5) and an external cross section of the reaction piston (5).

7 Claims, 2 Drawing Sheets

MASTER CYLINDER WITH DYNAMIC REACTION REGULATED BY A DIFFERENCE IN CROSS SECTION

The present invention relates to a master cylinder with hydraulic reaction for a pneumatic brake booster, comprising: a body pierced with a main bore; a cylindrical main piston pierced with a secondary bore, and of which one end, outside the body, can receive a boost force directed in a first direction, this main piston being mounted so that it can slide, without leaking, in the main bore in order therein to delimit a working chamber which during operation is subjected to a hydraulic pressure; and hydraulic reaction means which are mounted so that they can slide in the secondary bore and including a push rod of which one end, outside the body, can receive an actuating force directed in the first direction; with respect to the actuating force, the boost force having a delay that increases the rate of application of the actuating force.

BACKGROUND OF THE INVENTION

A master cylinder of this type is described, for example, in patent FR-2,724,354.

Devices of this type have been developed very recently for their ability to overcome the dynamic shortcomings of pneumatic brake boosters.

Now it is known that pneumatic brake boosters which are used to provide a force to assist with braking which is added to the actuating force exerted by the driver on the brake pedal and is in theory proportional to this force, have the shortcoming of being able to develop this boost force only after a certain delay from the application of the actuating force.

As the boost force is the result of the difference between the pneumatic pressures which there are on the one hand in a front chamber of the booster, this chamber being connected to a source of partial vacuum, and on the other hand in a rear chamber which is connected to atmosphere during braking, and as the delay in boost force compared with the actuating force is due to a limit on the rate at which atmospheric air is let into the rear chamber through the booster inlet valve at the time of braking, this delay is longer, the more abrupt the braking.

Now, the situations in which braking is rapid are generally emergency situations in which the driver would, by contrast, specifically need the greatest possible boost force as early as possible.

These considerations have quite recently led to the development of master cylinders with hydraulic reaction which, on the one hand, allow the booster inlet valve to open wider and therefore allow an increased air flow rate and, on the other hand, allow a dynamic modulation of the reaction force, that is to say a modulation as a function of the rate of brake application of the fraction of the boost force with which the reaction master cylinder opposes the actuating force in order to adjust the boost force as a function of this actuating force.

Using devices described in documents which have not been pre-published, it is thus possible considerably to reduce the reaction force in the event of emergency braking as compared with the value it would have for normal braking, and this allows a corresponding increase in the braking force available for emergency braking situations.

However, a problem still encountered in developing these devices lies in the difficulty of giving very high values to the ratio between the boost force and the actuating force, that is to say the difficulty of giving the reaction force very low values.

SUMMARY OF THE INVENTION

The object of the present invention is to provide a solution to this problem.

To this end, the master cylinder of the invention, which in other respects is in accordance with the preamble above, is essentially characterized in that in addition to the push rod, the hydraulic reaction means comprise: a central shut-off piston succeeding the push rod in the first direction and comprising a radial extension which is urged against an internal shoulder of the main piston by a first elastic force directed in the first direction, this central shut-off piston further having a front face pointing in the first direction and carrying a shut-off seat; a stepped and hollow reaction piston having a first internal cross section in which the central shut-off piston is mounted with leaktight sliding, a second internal cross section succeeding the first internal cross section in the first direction, and an external cross section sliding, without leaking, in the secondary bore, this reaction piston being urged by a second elastic force directed in a second direction, the opposite of the first direction, and of a lower intensity than the first elastic force, toward a position of rest in which it rests against the radial extension, this reaction piston in turn pushing the push rod back in the second direction against a moving stop that moves with the radial extension; and a ratio-change piston which is tubular, open to the working chamber, mounted with leaktight sliding in the second internal cross section of the reaction piston and has a position of rest in which it rests against the shut-off seat under the effect of a third elastic force directed in the second direction and lower than the second elastic force, this ratio-change piston comprising a driving stop allowing the reaction piston to drive it in the first direction after a non-zero travel from the position of rest of this reaction piston, the result of this being that the ratio-change piston selectively makes the first internal cross section of the reaction piston communicate with the working chamber in response to a rapid application of the actuating force to the push rod transmitted to the ratio-change piston via the reaction piston.

In the simplest configuration, the reaction piston comprises bearing lugs which extend in the second direction beyond the radial extension of the central shut-off piston and via which it bears against the push rod.

In this configuration, the moving stop may itself consist of an internal narrowing of a ring urged by the first elastic force against the radial extension of the central shut-off piston.

Thanks to the invention, it is thus possible to reduce the reaction force as much as desired for emergency braking, and even to cancel it completely by giving the first internal cross section and the external cross section of the reaction piston the same diameter.

The first elastic force may, in the simplest possible way, be exerted by a first spring working in compression between the ring and a first fixed rest provided in the secondary bore, the second elastic force may be exerted by a second spring working in compression between an external shoulder of the reaction piston and a second fixed rest provided in the secondary bore, and the third elastic force may be exerted by a third spring working in compression between the reaction piston and the ratio-change piston.

Other features and advantages of the invention will emerge clearly from the description thereof which is given hereafter by way of non-limiting indication, with reference to the appended drawings:

DETAILED DESCRIPTION OF THE DRAWINGS

As indicated earlier, the invention relates to a master cylinder with hydraulic reaction 1 intended to equip a pneumatic brake booster 2.

Figure 1:
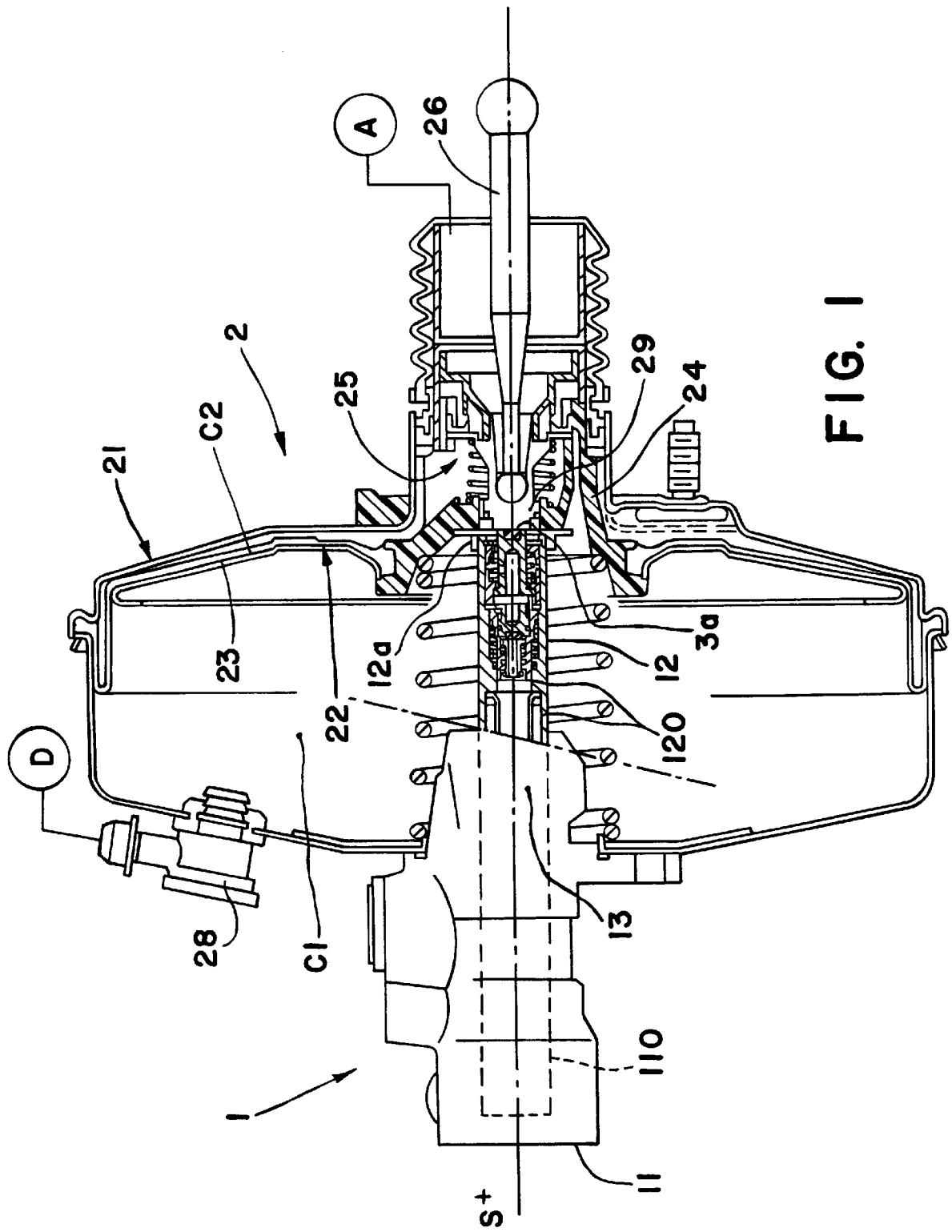
FIG. 1 is an overall sectional view of a booster incorporating the master cylinder of the invention.

In a way known per se, the pneumatic brake booster comprises (FIG. 1) a rigid casing 21, a moving partition 22 comprising a rigid skirt 23, a pneumatic piston 24, a three-way valve 25 and an operating rod 26 actuated by a brake pedal (not depicted).

The moving partition 22 divides the interior volume of the rigid casing 21 in leaktight fashion into two pneumatic chambers C1 and C2 of complementary and variable volume.

The first chamber, or front chamber C1 is connected to a low-pressure source D via a non-return valve 28, and the second chamber, or rear chamber C2 can be connected selectively, by means of the three-way valve 25, either to the low-pressure source D or to a relatively high-pressure source A, for example the atmosphere.

Thanks to this arrangement which is known per se, actuation of the three-way valve 25, which makes it possible to connect the rear chamber C2 to the second source A, causes a difference in pressure between the front and rear chambers C1 and C2, the moving partition 22 thus being urged by a force which represents the booster boost force and moving within the casing 21.

In practice, the three-way valve 25 is borne by the piston 24 and whether or not it opens to the rear chamber is controlled by the application of an actuating force in an axial direction S+ on the operating rod 26, this rod itself being borne by the piston 24 and ending in a feeler 29.

The master cylinder 1 is aligned with the operating rod 26 and essentially comprises a body 11 from which there project a main piston 12 and a push rod 3, this push rod forming part of hydraulic reaction means that will be detailed subsequently and are more specifically covered by the invention.

The body 11 is pierced with a main bore 110, in which the main piston 12, of cylindrical shape and pierced with a stepped secondary bore 120, is mounted so that it can slide, without leaking, in order therein to delimit a working chamber 13 which during operation is subject to a hydraulic pressure.

The end 12a of the main piston 12, which end is outside the body 11, has a part against which the pneumatic piston 24 can rest, so that it can receive the boost force transmitted to this pneumatic piston 24 by the moving partition 22 as a whole and directed in the axial direction S+.

Similarly, the end 3a of the push rod, which end is outside the body 11, has a part against which the feeler 29 can rest in order to receive the actuating force exerted by the driver in the axial direction S+ and transmitted through the operating rod 26.

The hydraulic-reaction means which more particularly form the subject-matter of the invention (FIG. 2) essentially comprise, in addition to the push rod 3, a central shut-off piston 4, a reaction piston 5 and a ratio-change piston 6.

The central shut-off piston 4 is arranged downstream of the push rod 3 with respect to the direction S+ and comprises a radial extension 41 which is urged against an internal shoulder 121 of the main piston 12 by a first spring 71.

More specifically, this spring 71, which works in compression between a first fixed rest 122 provided in the secondary bore 120 and a moving stop 81 consisting of an internal narrowing of a ring 8, exerts an elastic force directed in the direction S+ on the radial extension 41 via the ring 8.

Furthermore, the central shut-off piston 4 has a front face 42 pointing in the direction S+ and carrying a shut-off seat 43.

The reaction piston 5 is stepped and hollow and has a first internal cross section 51 in which the central shut-off piston 4 is mounted with leaktight sliding, a second internal cross section 52 succeeding the first internal cross section 51 in the direction S+ and an external cross section 53 sliding, without leaking, in the secondary bore 120.

Figure 2:
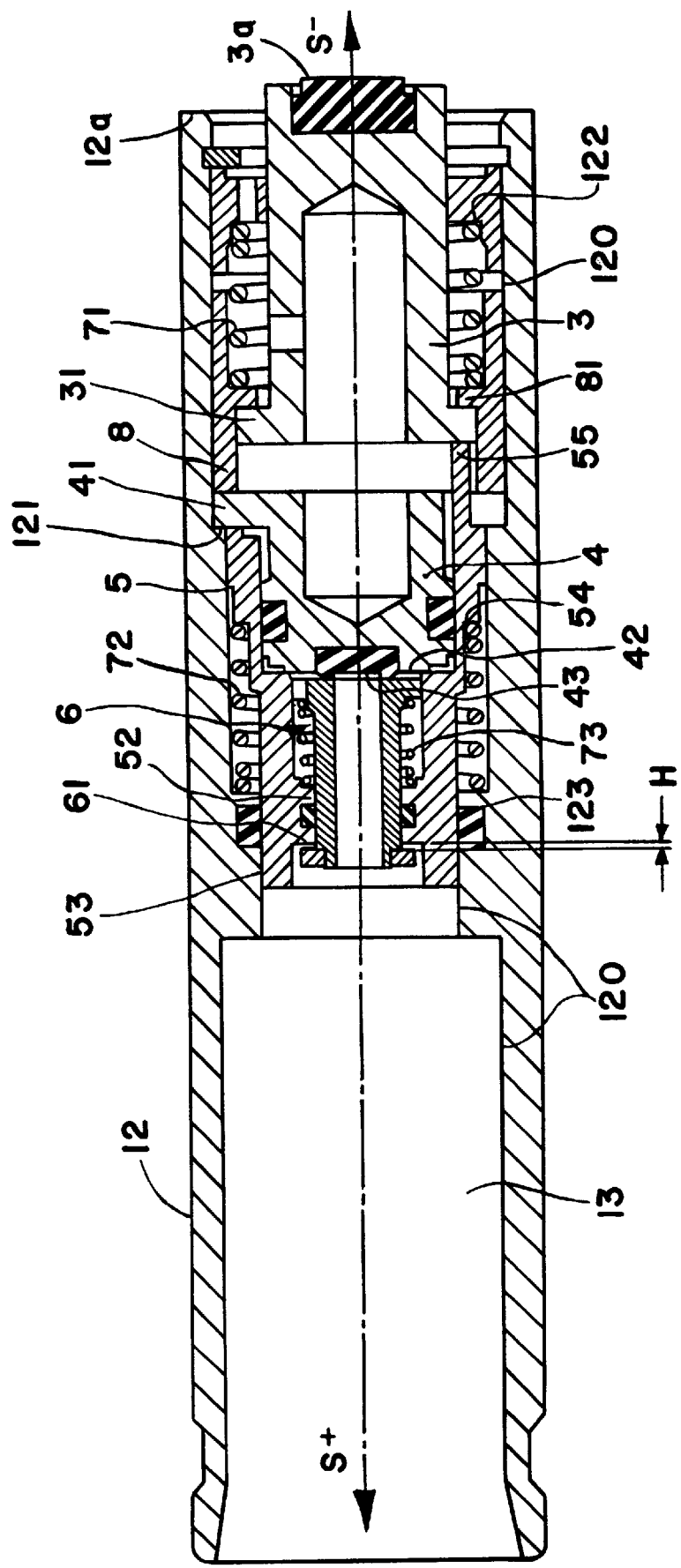
FIG. 2 is an enlarged sectional view of the part of the master cylinder in which the advantageous features of the invention.

This reaction piston is urged by a second spring 72 acting in a direction S−, which is the opposite of the direction S+, toward a position of rest which is that depicted in FIG. 2, and in which this reaction piston rests against the radial extension 41.

For this, the second spring 72 which is not as stiff as the first spring 71, works in compression between an external shoulder 54 of the reaction piston 5 and a second fixed rest 123 provided in the secondary bore 120.

As FIG. 2 shows, the reaction piston 5 comprises bearing lugs 55 which extend in the opposite direction S− beyond the radial extension 41 of the central shut-off piston 4, and via which the reaction piston 5 bears, under the effect of the spring 72, against the edge 31 of the push rod 3, which is thus pushed back in the opposite direction S− against the moving stop 81.

The ratio-change piston 6 is tubular, open to the working chamber 13 and mounted with leaktight sliding in the second internal cross section 52 of the reaction piston 5.

This ratio-change piston 6 has a position of rest which is the one depicted in FIG. 2 in which it bears against the shut-off seat 43 under the effect of a third spring 73 which is not as stiff as the second spring 72, which works in compression between the reaction piston 5 and the ratio-change piston 6 and which therefore exerts an elastic force directed in the opposite direction S− on this ratio-change piston 6.

The ratio-change piston 6 moreover comprises a driving stop 61 allowing the reaction piston 5 to drive it in the direction S+ after a non-zero travel H from the position of rest of this reaction piston.

Finally, in an extreme embodiment of the invention, the first internal cross section 51 and the external cross section 53 of the reaction piston 5 have the same diameter.

The way in which the master cylinder of the invention works is as follows.

If an actuating force that varies relatively slowly is applied to the operating rod, the driving-in of the feeler 29 over a distance that is shorter than or equal to the travel H for which the reaction piston 5 drives the ratio-change piston 6 along causes the valve 25 to open and therefore lets atmospheric air into the rear chamber C2.

In these conditions, the moving partition 22 exerts on the end 12a of the main piston 12 a boost force that displaces the main piston in the direction S+ and opposes a relative movement of the reaction piston 5 with respect to the main piston 12 in the direction S+ therefore prevents the reaction piston 5 from driving the ratio-change piston 6 along.

In this operating mode, the hydraulic pressure in the chamber 13 is therefore exerted on the external cross section 53 of the reaction piston and ends up pushing the reaction piston 5, the central shut-off piston 4 and the ring 8 back, compressing the first spring 71, and thus causes the normal reaction force which opposes the actuating force to be seen on the push rod 3.

If an actuating force that varies relatively quickly is applied to the operating rod, the reaction piston 5 drives the ratio-change piston 6 in the direction S+ before atmospheric air can be let into the rear chamber C2 in sufficient quantity for the moving partition 22 to be able to exert on the end 12a of the main piston 12 a boost force that is capable of displacing the main piston in the direction S+ and of taking up the movement of the reaction piston 5.

In this operating mode, the ratio-change piston 6 therefore makes the first internal cross section 51 of the reaction piston communicate with the working chamber 13 so that the hydraulic pressure in this chamber 13 can be exerted, for the reaction piston and therefore for the push rod 3, only on the difference between the external cross section 53 of this reaction piston and the first internal cross section 51 of this same reaction piston.

Thus, by giving the first internal cross section 51 and the external cross section 53 of the reaction piston 5 the same diameter or almost the same diameter, it is possible, according to the invention, to cancel or reduce the reaction force that opposes the actuating force exerted on the push rod 3 if this actuating force is applied rapidly, and it is therefore possible to increase the actuating force that is available for emergency braking situations.

I claim:

1. A master cylinder with hydraulic reaction for a pneumatic brake booster comprising:

a body pierced with a main bore;

a cylindrical main piston pierced with a secondary bore and of which one end located outside of the body, said main piston being mounted, without leaking, in said main bore in order to delimit a working chamber which during operation is subject to hydraulic pressure; and hydraulic reaction means mounted to slide in said secondary bore and including a push rod having one end outside of said body to receive an actuating force directed in said first direction with respect to said actuating force, said boost force having a delay that increases with the rate of application of said actuating force, characterized in that said hydraulic reaction means further comprises:

a central shut-off piston succeeding said push rod in said first direction and having a radial extension which is urged against an internal shoulder of said main piston by a first elastic force directed in said first direction, said central shut-off piston having a front face pointing in said first direction and carrying a shut-off seat;

a stepped and hollow reaction piston having a first internal cross section in which said central shut-off piston is mounted with leaktight sliding, a second internal cross section succeeding said first internal cross section in said first direction, and an external cross section sliding in leaktight fashion in said secondary bore, said reaction piston being urged by a second elastic force directed in a second direction in opposition of said first direction and of a lower intensity than said first elastic force toward a position of rest in which said reaction piston rest against said radial extension, said reaction piston in turn pushing said push rod back in said section direction against a moving stop that moves with said radial extension; and a ratio-change piston which is tubular and open to said working chamber and mounted with leaktight sliding in said second internal cross section of said reaction piston, said ratio-change piston having a position of rest in which said ratio-change piston rest against said shut-off seat under the effect of a third elastic force directed in said second direction and lower than said second elastic force, said ratio-change piston comprising a driving stop allowing said reaction piston to drive said ratio-change piston in said first direction after a non-zero travel from said position of rest of said reaction piston such that said ratio-change piston selectively brings said first internal cross section in communication with said working chamber in response to a rapid application of a reaction force to said push rod transmitted to said ratio-change piston by way of said reaction piston.

2. The master cylinder with hydraulic reaction as recited in claim 1 characterized in that said reaction piston comprises bearing lugs which extend in said second direction beyond said radial extension of said central shut-off piston and via of which said reaction piston bears against said push rod.

3. The master cylinder with hydraulic reaction as recited in claim 1 characterized in that said moving stop consists of an internal narrowing of a ring urged by said first elastic force against said radial extension of said central shut-off piston.

4. The master cylinder with hydraulic reaction as recited in claim 1 characterized in that said first internal cross section and said external cross section of said reaction piston have the same diameter.

5. The master cylinder with hydraulic reaction as recited in claim 3 characterized in that said first elastic force is exerted by a first spring working in compression between said ring and a first fixed rest located in said secondary bore.

6. The master cylinder with hydraulic reaction as recited in claim 1 characterized in that said second elastic force is exerted by a second spring working in compression between an external shoulder of said reaction piston and a second fixed rest located in said second bore.

7. The master cylinder with hydraulic reaction as recited in claim 1 characterized in that said third elastic force is exerted by a third spring working in compression between said reaction piston and said ratio-change piston.

* * * * *